(12) United States Patent
Xu

(10) Patent No.: US 12,288,308 B2
(45) Date of Patent: Apr. 29, 2025

(54) VIDEO PROCESSING METHOD AND APPARATUS, AND ELECTRONIC DEVICE AND STORAGE MEDIUM

(71) Applicant: Beijing Zitiao Network Technology Co., Ltd., Beijing (CN)

(72) Inventor: Yitian Xu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/617,445

(22) Filed: Mar. 26, 2024

(65) Prior Publication Data

US 2024/0233071 A1  Jul. 11, 2024

Related U.S. Application Data

(63) Continuation of application No. PCT/CN2022/127841, filed on Oct. 27, 2022.

(30) Foreign Application Priority Data

Oct. 27, 2021  (CN) .......................... 202111257788.0

(51) Int. Cl.
  *G06T 3/4023*  (2024.01)
  *G06T 5/73*    (2024.01)
(52) U.S. Cl.
  CPC .............. *G06T 3/4023* (2013.01); *G06T 5/73* (2024.01); *G06T 2207/10016* (2013.01)
(58) Field of Classification Search
  None
  See application file for complete search history.

(56) References Cited

U.S. PATENT DOCUMENTS 7,929,853 B2   4/2011  Park et al.
10,931,854 B2  2/2021  Paluri
(Continued)

FOREIGN PATENT DOCUMENTS

CN   103763515 A   4/2014
CN   111131688 A   5/2020
(Continued)

OTHER PUBLICATIONS

International Search Report and Written Opinion for PCT/CN2022/127841, mailed Jan. 16, 2023, 10 pages.
(Continued)

*Primary Examiner* — Leon Viet Q Nguyen
(74) *Attorney, Agent, or Firm* — Astute IP Law Group

(57) ABSTRACT

Disclosed in the embodiments of the present disclosure are a video processing method and apparatus, and an electronic device and a storage medium. The method include: determining a blurred video frame in an initial video; removing the blurred video frame from the initial video, so as to obtain an intermediate video, which dose not comprise the blurred video frame; on the basis of a video frame in the intermediate video that has a timestamp adjacent to a target timestamp, determining a video frame to be inserted, wherein the target timestamp is the timestamp of the blurred video frame; and inserting into a position in the intermediate video that corresponds to the target timestamp, the video frame to be inserted, so as to obtain a target video.

16 Claims, 3 Drawing Sheets

(56) References Cited

U.S. PATENT DOCUMENTS

| | | | | |
|---|---|---|---|---|
| 2009/0174782 A1* | 7/2009 | Kahn | ................... | G02B 27/646 |
| | | | | 348/208.2 |
| 2010/0056211 A1 | 3/2010 | Park et al. | | |
| 2011/0274412 A1 | 11/2011 | Kobayashi | | |
| 2014/0003734 A1* | 1/2014 | Umansky | .................. | G06T 5/73 |
| | | | | 382/275 |
| 2018/0225852 A1* | 8/2018 | Um | ......................... | G06T 7/292 |
| 2019/0132492 A1* | 5/2019 | Paluri | ................ | H04N 21/4788 |

FOREIGN PATENT DOCUMENTS

| | | |
|---|---|---|
| CN | 111372000 A | 7/2020 |
| CN | 111641835 A | 9/2020 |
| CN | 113297420 A | 8/2021 |
| JP | 2003132358 A | 5/2003 |
| WO | 2019083789 A1 | 5/2019 |
| WO | 2021/182759 A1 | 9/2021 |

OTHER PUBLICATIONS

Communication Pursuant to Rules 70(2) and 70a(2) EPC for European Patent Application No. 22886048.2, mailed on Dec. 17, 2024, 1 Page.
Extended European Search Report for European Patent Application No. 22886048.2, mailed on Nov. 28, 2024, 10 Pages.
Office Action for Japanese Patent Application No. 2023-578982, mailed on Mar. 4, 2025, 8 pages.

* cited by examiner

VIDEO PROCESSING METHOD AND APPARATUS, AND ELECTRONIC DEVICE AND STORAGE MEDIUM

CROSS-REFERENCE TO RELATED APPLICATIONS

The present application is a continuation of International Patent Application No. PCT/CN2022/127841, filed on Oct. 27, 2022 which claims the priority of Chinese Patent Application No. 202111257788.0, entitled "Video Processing Method And Apparatus, And Electronic Device And Storage Medium" filed on Oct. 27, 2021, the entire content of which is incorporated in the present application by reference.

TECHNICAL FIELD

The present disclosure relates to the field of information technology, particularly to a video processing method, apparatus, electronic device and storage medium.

BACKGROUND

In recent years, with the rapid development of electronic device technology, many electronic devices support video capturing, and the video capturing quality has become one of the important indicators for evaluating the electronic devices. There are many factors which can influence the video capturing quality, such as, resolution, saturation, sharpness, and etc. Among them, the sharpness is a very important influence factor.

When a video is captured with an electronic device, and in the case that the captured object moves or the electronic device shakes during the exposure time, motion-blurred images may appear in the captured video, which is specifically manifested as blurred image, diffusion, or dragging.

Therefore, to obtain a video with good quality, there is a need for processing blurred images in the video.

SUMMARY OF THE INVENTION

To solve all or at least a part of the above technical problems, embodiments of the present disclosure provide a video processing method, apparatus, electronic device, and storage medium, for removing the blurred frames in the video and improving the video quality.

In a first aspect, a video processing method is provided, comprising:
  determining a blurred video frame in an initial video;
  removing the blurred video frame from the initial video to obtain an intermediate video which does not comprise the blurred video frame;
  determining a video frame to be inserted based on a video frame whose timestamp is adjacent to a target timestamp in the intermediate video, wherein the target timestamp is a timestamp of the blurred video frame; and
  inserting the video frame to be inserted at a position in the intermediate video which is corresponding to the target timestamp to obtain a target video.

In a second aspect, a video processing apparatus is provided, comprising: a first determining module, a removing module, a second determining module and a frame-inserting module.

The first determining module is configured to determine a blurred video frame in an initial video.

The removing module is configured to remove the blurred video frame from the initial video to obtain an intermediate video which does not comprise the blurred video frame.

The second determining module is configured to determine a video frame to be inserted based on a video frame whose timestamp is adjacent to a target timestamp in the intermediate video, wherein the target timestamp is a timestamp of the blurred video frame.

The frame-inserting module is configured to insert the video frame to be inserted at a position corresponding to the target timestamp in the intermediate video to obtain a target video.

In a third aspect, an electronic device is provided, comprising:
  one or more processors; and
  a memory configured to store one or more programs;
    wherein when the one or more programs are executed by the one or more processors, the one or more processors is caused to perform the method as described above.

In a fourth aspect, a computer-readable storage medium having a computer program stored thereon is provided, wherein when the program is executed by a processor, the method as described above is performed.

The technical solutions provided in the embodiment of the present disclosure have at least the advantages as follows when compared with the prior art.

In the video processing method provided in the embodiments of the present disclosure, firstly, a blurred video frame in the initial video is determined, then the blurred video frame is removed from the initial video, and a clear video frame is inserted by means of frame insertion at a position where the video frame is removed, thereby improving the video quality.

BRIEF DESCRIPTION OF THE DRAWINGS

The above and other features, advantages, and aspects of various embodiments of the present disclosure will become more apparent with reference to the accompanying drawings and the following embodiments. Throughout the drawings, the same or similar reference signs represent the same or similar elements. It should be understood that the drawings are schematic, and the initial and elements are not necessarily drawn to scale.

DETAILED DESCRIPTION OF THE INVENTION

Hereinafter the embodiments of the present disclosure are described more detailedly with reference to the accompanying drawings. Although some embodiments of the present disclosure are shown in the accompanying drawings, it should be understood that the present disclosure can be implemented in various ways, and should not be construed to be limited to the embodiments as set forth herein. On the contrary, the embodiments are provided to understand the present disclosure more completely and fully. It should be understood that the accompanying drawings and embodiments of the present disclosure are merely used for illustrative purposes, and are not intended to limit the protection scope of the present disclosure.

It should be understood that various steps of the method embodiments of the present disclosure can be performed in different orders and in parallel. In addition, the method embodiments can comprise additional steps and/or omit one or more steps as shown. The scope of the present disclosure is not limited in this respect.

As used herein, the term "comprise" and its variants is an inclusion in an open mode, that is, "comprising, but being not limited to". The term "based on" means "at least partially based on". The term "an/one embodiment" represents "at least one embodiment"; the term "another embodiment" represents "at least one additional embodiment"; and the term "some embodiments" represents "at least some embodiments". The related definitions of other terms are provided in the following description.

It is to be noted that the concepts such as "first" and "second" mentioned in the present disclosure are only used to distinguish different apparatuses, modules or units, and are not intended to limit the order of functions performed by these apparatuses, modules or units or the interdependence relationships between the apparatuses, modules or units.

It is to be noted that the modifications with "a/an/one" or "a plurality of/multiple" mentioned in the present disclosure are schematic, rather than restrictive. Persons skilled in the art should understand that they should be construed as "one or more", unless specifically explained in other ways in the context.

The name of message or information interacted between multiple apparatuses in the present disclosure is merely used for illustrative purpose, and are not intended to limit the scope of the messages or information.

Figure 1:
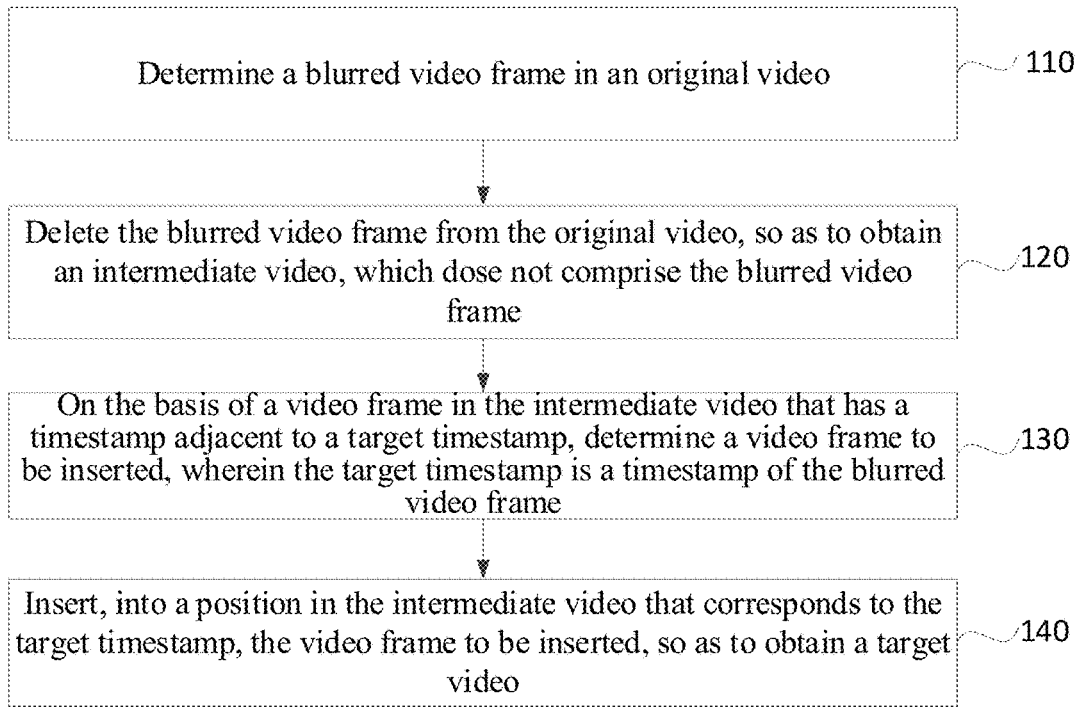
FIG. 1 is a flowchart of a video processing method in an embodiment of the present disclosure.

FIG. 1 is a flowchart of a video processing method in an embodiment of the present disclosure. The method can be performed by a video processing apparatus which can be implemented by software and/or hardware. The apparatus can be assembled in an electronic device, such as, in a display terminal, which may comprise, but is not limited to, such as, smart phone, palmtop, tablet laptop, portable wearable device, and smart-home device (e.g., table lamp) or the like devices with a display screen.

As shown in FIG. 1, the method may include the steps as follows.

Step 110: determining a blurred video frame in an initial video.

Specifically, an edge image of each video frame in the initial video can be determined with a preset algorithm, and then a video frame with a blurred image or with a drag is determined based on the edge image. Such a video frame is the so-called blurred video frame. In the embodiment of the present disclosure, the blurred video frame is referred to as a first video frame.

Step 120: removing the blurred video frame from the initial video to obtain an intermediate video which does not comprise the blurred video frame.

Step 130: determining a video frame to be inserted based on a video frame whose timestamp is adjacent to a target timestamp in the intermediate video, wherein the target timestamp is a timestamp of the blurred video frame.

Assuming that a timestamp of a blurred frame is 2-second, that is, the first video frame is at a position where the initial video is played to 2-second. After the first video frame is removed from the initial video, there would be a missing video frame at the 2-second position on the playback timeline of the intermediate video. In order to achieve better video quality and ensure continuity in the video, a video frame (referred to as "video frame to be inserted") is inserted at the 2-second position to guarantee the smooth visual transition between frames.

Optionally, the video frames to be inserted are determined based on the video frames at the 1-second and 3-second positions in the intermediate video. Specifically, the video frame located between the two adjacent video frames can be predicted based on the two adjacent video frames with a preset frame interpolation algorithm. For example, the video frame to be inserted can be determined based on a motion estimation method or through neural network. In the embodiment of the present disclosure, the way of determining the video frame to be inserted based on a video frame whose timestamp is adjacent to the target timestamp in the intermediate video is not limited to the way disclosed herein.

Step 140: inserting the video frames to be inserted in the position corresponding to the target timestamp in the intermediate video, to obtain the target video.

For example, the number of the video frame is 1, and the corresponding timestamp is 2-second, that is, the position where the initial video is played to 2-second is the position of the first video frame. After the first video frame is removed from the initial video, a video frame will be missing at the 2-second position of the playing timeline. To obtain a good video effect and ensure a video continuity, a video frame is inserted at the 2-second position to ensure the continuity of the video pictures. In the embodiment of the present disclosure, the inserted video frame is referred to as a second video frame.

In some embodiments, the number of the inserted second video frames is the same as the number of the removed first video frames. For example, two first video frames are removed from the initial video, and then two second video frames will be inserted into the initial video after the removing.

In some embodiments, the number of the inserted second video frames is more than that of the removed first video frames. For example, two first video frames are removed from the initial video, and three second video frames are inserted into the initial video after the removing. Inserting more second video frames can improve the frame rate of the initial video, thereby further improving the playing effect of the initial video.

In the video processing method provided in the embodiment of the present disclosure, a video frame with poor image quality in the initial video is first determined, and then the video frame with poor image quality is removed from the initial video, and a video frame with better image quality is inserted at the position where the video frame is removed throughout frame interpolation. In this way, blurred frames can be removed and clear video frames can be inserted to substitute the removed blurred frame, thereby achieving the purpose of improving the video quality.

Figure 2:
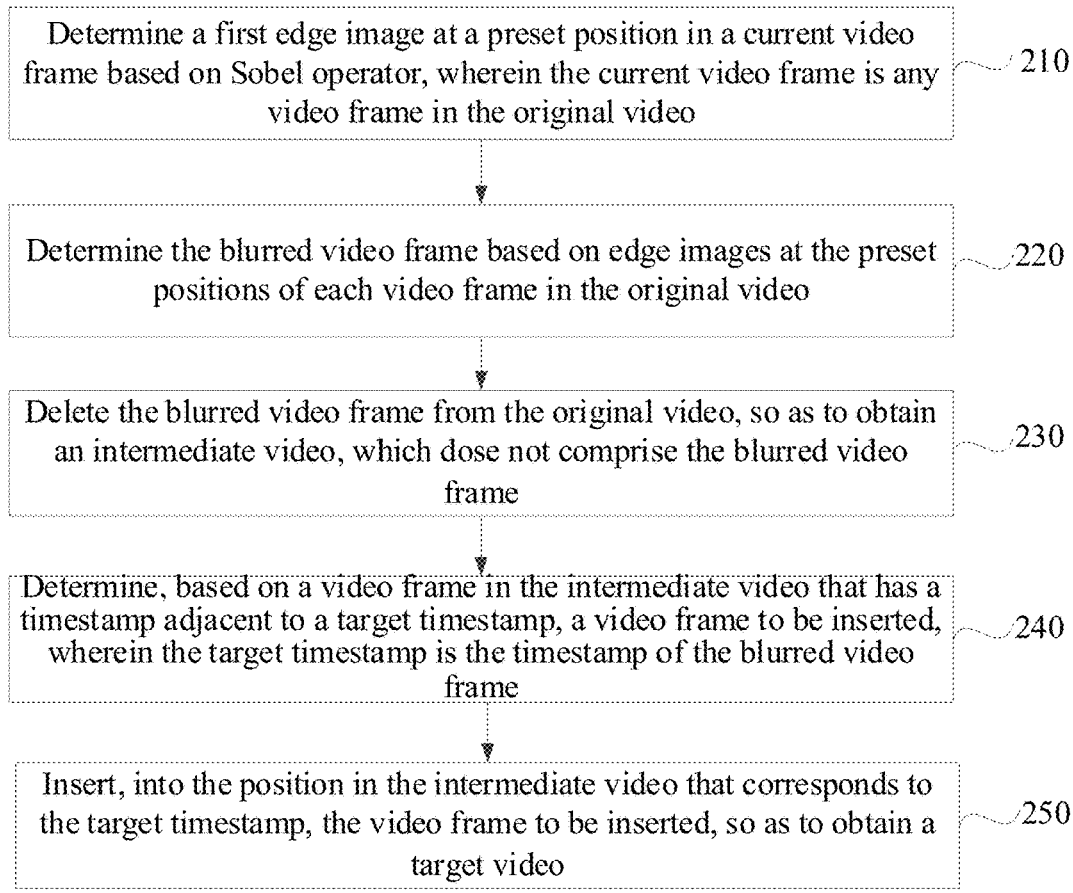
FIG. 2 is a flowchart of a video processing method in an embodiment of the present disclosure.

On the basis of the above embodiment, FIG. 2 is a flowchart schematic diagram of a video processing method. Based on the above embodiment, this embodiment provides a specific way of implementation as to the above-mentioned step 110 of "determining the blurred video frame in the initial video".

As shown in FIG. 2, the video processing method comprises the steps as follows.

Step 210: determining a first edge image at a preset position in a current video frame based on Sobel operator, wherein the current video frame is any video frame in the initial video.

Step 220: determining the blurred video frame based on an edge image at a preset position of each video frame in the initial video.

Figure 3:
FIG. 3 is a schematic diagram of positions of edges of an image in an embodiment of the present disclosure.

In the above steps, the preset position refers to an edge position of the image. For example, in a schematic diagram of the edge position of an image as shown in FIG. 3, the part outlined by white lines are the edge positions of the image, and the image including only white lines is the edge image, that is, an image composed of edges. Sobel operator is mainly used for the image edge detection. It performs an edge detection on a feature that reaches the extreme value at the edge according to the weighted difference of gray levels of the upper, lower, left and right neighboring pixels of a current pixel. Using the Sobel operator at any pixel in the image will result in generating a corresponding grey level vector or a normal vector thereof. In other words, for each video frame in the initial video, the edge image thereof is calculated, and a video frame whose image quality does not meet a preset condition is determined according to the edge image of each video frame. That is, the blurred video frame is determined according to the edge frame, wherein the blurred video frame is the first video frame. The number of blurred video frames in the initial video may be either multiple (i.e., more than two), or one.

Further, in some embodiments, the determining the blurred video frame based on the edge image at the preset position of each video frame in the initial video comprises the following steps:

determining a first cumulative sum of pixel values of various pixels in the first edge image; determining a second cumulative sum of pixel values of various pixels in a second edge image at a preset position of a neighboring video frame, wherein the neighboring video frame is a video frame adjacent to the current video frame in the initial video; determining an absolute value of a first difference between the first cumulative sum and the second cumulative sum; and determining the blurred video frame based on the absolute value of the first difference.

Optionally, in some embodiments, when the absolute value of the first difference is greater than a first preset threshold, the current video frame is determined as the blurred video frame. For example, assuming that the cumulative sum of pixel values of all the pixels in the edge image of the $i^{th}$ ($i \geq 1$) video frame of the initial video is edge_sum(i), the cumulative sum of pixel values of all the pixels in the edge image of the $(i-1)^{th}$ video frame is edge_sum(i−1), cond1=abs(edge_sum(i)−edge_sum(i−1)), in which the abs( ) represents a function that takes an absolute value; when the cond1 is greater than the first preset threshold, the $i^{th}$ video frame in the initial video is considered as the first video frame.

Figure 4:
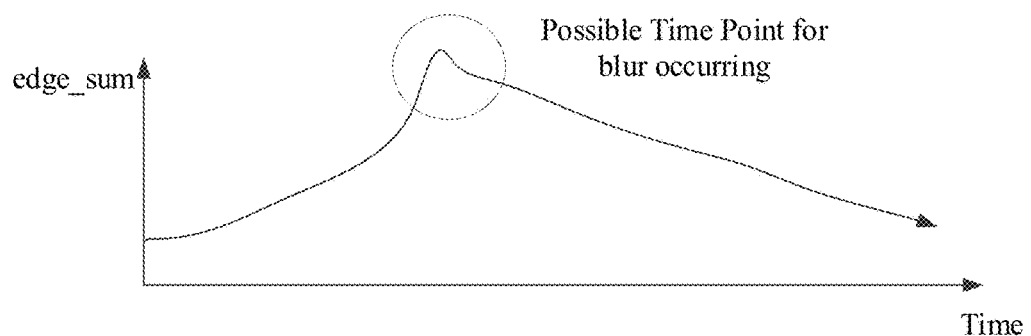
FIG. 4 is a schematic diagram of changes of the cumulative sum of pixel values of all pixels in the edge image corresponding to each video frame in the initial video in an embodiment of the present disclosure.

More specifically, assuming that the edge image of the $i^{th}$ video frame comprises 4 pixels which corresponding to pixel values of 5, 15, 2 and 0, respectively, then the pixel values corresponding to the 4 pixels have a cumulative sum of edge_sum(i)=5+15+2+0=22. The edge image of the $(i-1)^{th}$ video frame comprises 4 pixels which correspond to the pixel values of 4, 10, 1 and 3, respectively, and then the pixel values corresponding to the 4 pixels have a cumulative sum of edge_sum(i−1)=4+10+1+3=18. Thus, cond1(i)=abs (edge_sum(i)−edge_sum(i−1))=abs(2−18)=4. Referring to a schematic diagram of change in cumulative sum of pixel values of all pixels in an edge image corresponding to each video frame in the initial video in the embodiment of the present disclosure shown in FIG. 4, the abrupt change position is a potential time point at which the blurring occurs.

In some embodiments, to further improve the accuracy for determining the blurred frame, the determining the blurred video frame based on the absolute value of the first difference may comprise: determining a maximum absolute value of the difference in the total pixel number for various pixel values between the first edge image and the second edge image, based on histograms of the first and second edge images.

Specifically, the total number of the first pixels in the first edge image whose pixel value is the target value is determined based on the histogram of the first edge image, wherein the target value is any one of the pixel values in the first edge image; the total number of the second pixels in the second edge image whose pixel value is the target value is determined based on the histogram of the second edge image; an absolute value of a second difference between the total number of the first pixels and the total number of the second pixels is determined; a maximum absolute value of the second differences corresponding to various pixel values in the first edge images is determined; and the blurred video frame is determined based on the absolute value of the first difference and the maximum absolute value of the second differences. For example, assuming that the pixel values of all pixels in the first edge image range from 0 to 15 (a total of 16 values), that is, the target value is any one of the 16 values; the pixel values of all pixels in the second edge image range from 0 to 15; then the maximum absolute value of the second differences corresponding to various pixel value in the first edge image can be expressed as max{abs (hist(i)(k)−hist(i−1)(k))}, where abs( ) represents the function that takes the absolute value, and hist(i)(k) represents the total number of the first pixels with pixel value of k in the $i^{th}$ edge image (which can be understood as the first edge image), hist(i−1)(k) represents the total number of the second pixels with pixel value of k in the $(i-1)^{th}$ edge image (which can be understood as the second edge image), that is, the target value is k, $0 \leq k < 16$. More specifically, assuming that in the edge image of the $i^{th}$ video frame, the total number of pixels with pixel value of 0 is 5, the total number of pixels with pixel value of 1 is 15, the total number of pixels with pixel value of 2 is 2, and the total number of pixels with pixel value of 3 is 0; in the edge image of the $(i-1)^{th}$ video frame, the total number of pixels with pixel value of 0 is 4, the total number of pixels with pixel value of 1 is 10, the total number of pixels with pixel value of 2 is 1, and the total number of pixels with pixel value of 3 is 3; then cond2(i) =max{abs(hist(i)(k)−hist(i−1)(k))}=max{abs(5−4), abs(15−10), abs(2−1), abs(0−3)}=5.

In some embodiments, the determining the blurred video frame based on the absolute value of the first difference and the maximum absolute value of the second differences comprises: performing a weighted sum on the absolute value of the first difference and the maximum absolute value of the second differences to obtain a blur degree; and determining the current video frame as the blurred video frame when the blur degree is greater than a second preset threshold. For example, the blur degree cond(i)=c1*cond1(i)+c2*cond2(i), wherein c1 and c2 are preset constants. When cond(i)>thr1, the $i^{th}$ video frame is determined as the blurred frame, that is, a first video frame whose image quality does not meet the preset condition, and thr1 is the second preset threshold.

In some embodiments, to reduce the calculation cost and improve the calculation speed, in prior to determining the first cumulative sum of the pixel values of various pixels in the first edge image, the determining the blurred video frame based on the edge images at the preset positions of the various video frames in the initial video may further comprise: normalizing the edge images at the preset positions of the various video frames in the initial video to map the pixel values of the pixels in the edge image to a preset range; wherein the edge image is a single-channel image. Initially, the pixel value of each pixel in the edge image ranges from 0 to 255. When determining the blurred frame, it is required to calculate the total number of pixels corresponding to each pixel value and the cumulative sum of the pixel values of various pixels; as a result, the calculation cost is large. To reduce the calculation cost and to improve calculation efficiency, in prior to determining the first cumulative sum of the pixel values of the various pixels, each edge image is normalized, to map the pixel values of the pixels in the edge image to a preset range, e.g., mapping the pixel values that were within a range of 0-255 to a range of 0-16.

In some embodiments, to ensure the video continuity, it is not allowable to remove too many first video frames. Therefore, when the number of the blurred video frames exceeds a third preset threshold, the method may further comprise: filtering multiple first video frames to retain only a limited number of the first video frames. For example, when the third preset threshold is 8, then at most 8 first video frames will be retained. When the number of the first video frames determined according to the determination method in the above embodiment is 10, then 2 frames need to be filtered out and 8 frames should be retained, that is, at most 8 first video frames can be removed from the initial video. Specifically, a maximum absolute value of the first difference or a maximum one of the blur degrees is determined as an extreme point; and the blurred video frames are screened based on the timestamp of the video frame corresponding to the extreme point to obtain blurred video frames, with the number of the blurred video frames being the third preset threshold. Further, screening the blurred video frames based on the timestamp of the video frame corresponding to the extreme point to obtain the blurred video frames, with the number of the blurred video frames being the third preset threshold comprises the following step:

taking the timestamp of the video frame corresponding to the extreme point as a center, and taking a preset number of video frames in front of and after the center as the blurred video frames which are retained after the screening, respectively, wherein the preset number is determined according to the third preset threshold.

For example, by calculation, it is determined that the blur degree corresponding to the first one video frame in the initial video is 0, the blur degree corresponding to the second one video frame in the initial video is 0, the blur degree corresponding to the third one video frame in the initial video is 6, the blur degree corresponding to the fourth one video frame in the initial video is 7, the blur degree corresponding to the fifth one video frame in the initial video is 6, and the blur degree corresponding to the sixth one video frame in the initial video is 6. Assuming that the second preset threshold is 5, then the third one video frame, the fourth one video frame, the fifth one video frame and the sixth one video frame are the first video frames as described above. The number of the first video frames is 4, that is, the number of the blurred frames is 4. Assuming that the third preset threshold is 3, then it is required to screen one video frame out of the above 4 first video frames and retain the other three video frames. Specifically, since the maximum of the blur degrees is 7, thus 7 is determined as the extreme point, and the corresponding video frame corresponding to the extreme point is the fourth one video frame, and the timestamp of the video frame corresponding to the extreme point is the timestamp of the fourth one video frame in the initial video. Taking this timestamp as the center, a preset number of video frames are respectively taken before and after the timestamp as blurred video frames retained after screening. For example, a video frame with a timestamp closest to the timestamp of the fourth one video frame is taken before the fourth one video frame, that is, the third one video frame; a video frame with a timestamp closest to the timestamp of the fourth one video frame is taken after the fourth timestamp, that is, the fifth one video frame; and thus, finally, the third one video frame, the fourth one video frame and the fifth one video frame are determined as the first video frames. The first one video frame, the second one video frame and the sixth one video frame are screened out.

Step 230: removing the blurred video frame from the initial video to obtain an intermediate video which does not comprise the blurred video frame.

Step 240: determining a video frame to be inserted based on a video frame whose timestamp is adjacent to a target timestamp in the intermediate video, wherein the target timestamp is the timestamp of the blurred video frame.

Step 250: inserting the video frame to be inserted into the intermediate video at a position corresponding to the target timestamp to obtain a target video.

Figure 5:
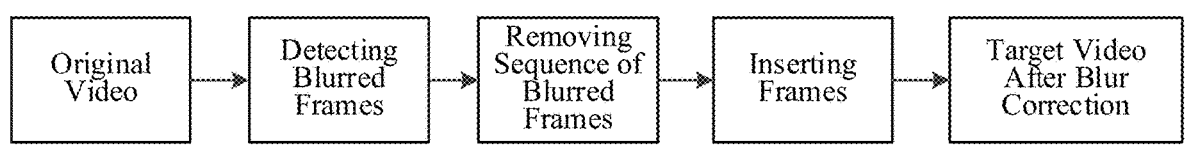
FIG. 5 is a flowchart of a video processing method in an embodiment of the present disclosure.

In summary, referring to a schematic flowchart of a video processing method as shown in FIG. 5, the method may specifically comprise: detecting blurred frames in the initial video, obtaining a sequence of blurred frames and removing the sequence of the blurred frames from the initial video, and then making up for the removed video frames by means of frame insertion to obtain a blur-repaired target video, thereby achieving an object of improving the video quality.

Figure 6:
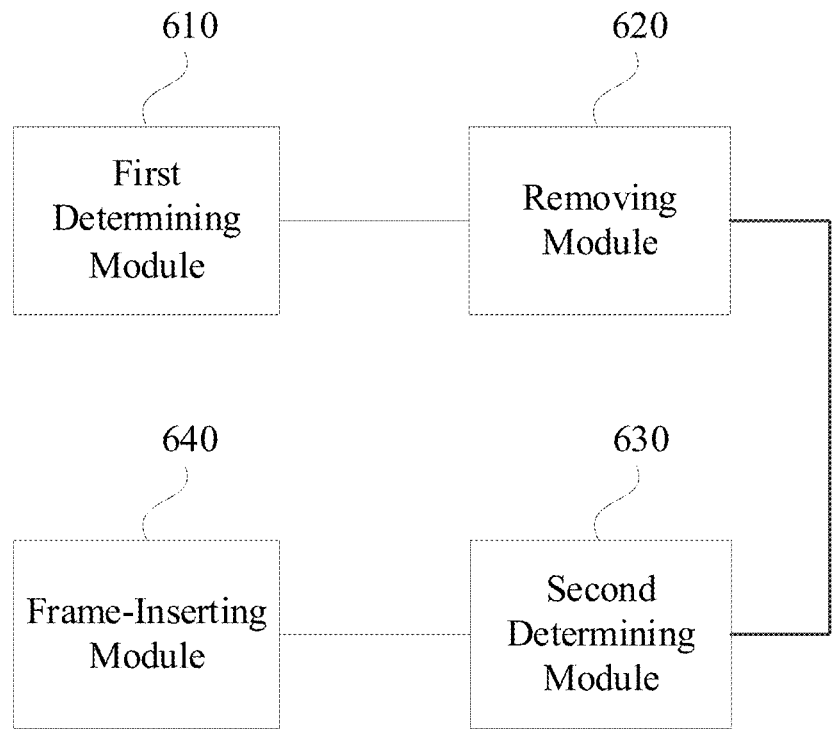
FIG. 6 is a structural schematic diagram of a video processing apparatus provided in an embodiment of the present disclosure.

FIG. 6 is a structural schematic diagram of a video processing apparatus provided in an embodiment of the present disclosure. As shown in FIG. 6, the video processing apparatus comprises: a first determining module 610, a removing module 620, a second determining module 630 and a frame-inserting module 640.

Among them, the first determining module 610 is configured to determine the blurred video frame in the initial video; the removing module 620 is configured to remove the blurred video frame from the initial video to obtain an intermediate video that does not comprise the blurred video frame; the second determining module 630 is configured to determine the video frame to be inserted based on a video frame in the intermediate video whose timestamp is adjacent to the target timestamp, wherein the target timestamp is the timestamp of the blurred video frame; and the frame-inserting module 640 is configured to insert the video frame to be inserted into the intermediate video at position corresponding to the target timestamp to obtain a target video.

Optionally, the first determining module 610 may specifically comprise: a first determination unit and a second determination unit. The first determination unit is configured to determine a first edge image at a preset position of the current video frame based on the Sobel operator, wherein the current video frame is any one video frame in the initial video. The second determination unit is configured to determine the blurred video frame based on the edge images at the preset positions in each video frame in the initial video.

Optionally, the second determination unit may specifically comprise: a first determination sub-unit and a second determination sub-unit. The first determination sub-unit is configured to determine a first cumulative sum of pixel values of various pixels in the first edge image; determining a second cumulative sum of pixel values of various pixels in a second edge image at a preset position of a neighboring video frame, wherein the neighboring video frame is a video frame adjacent to the current video frame in the initial video; determining an absolute value of a first difference between the first cumulative sum and the second cumulative sum. The second determination sub-unit configured to determine the blurred video frame based on the absolute value of the first difference.

Optionally, the second determination sub-unit may be specifically configured to determine the current video frame as the blurred video frame when the absolute value of the first difference is greater than a first preset threshold.

Optionally, the second determination sub-unit may be specifically configured to: determine the total number of the first pixels in the first edge image whose pixel value is the target value based on the histogram of the first edge image, wherein the target value is any one of the pixel values in the first edge image; determine the total number of the second pixels in the second edge image whose pixel value is the target value based on the histogram of the second edge image; determine an absolute value of a second difference between the total number of the first pixels and the total number of the second pixels; determine a maximum value of absolute values of the second differences corresponding to various pixel values in the first edge images; and determine the blurred video frame based on the absolute value of the first difference and the absolute value of the second differences.

Optionally, the second determination sub-unit may be specifically configured to: perform a weighted sum on the absolute value of the first difference and the absolute value of the second differences to obtain a blur degree; and determine the current video frame as the blurred video frame when the blur degree is greater than a second preset threshold.

Optionally, the apparatus may further comprise a normalization module, which is configured to normalize the edge images at the preset positions of the various video frames in the initial video, before the determining the first cumulative sum of pixel values of various pixels in the first edge image, to map the pixel values of the pixels in the edge image to a preset range; wherein the edge image is a single-channel image.

Optionally, the apparatus may further comprise a screening module, which is configured to determine a maximum absolute value of the first difference or a maximum blur degree as an extreme point when the number of the first video frames exceeds a third preset threshold; and screen the blurred video frames based on a video frame whose timestamp corresponds to the extreme point to obtain blurred video frames, with the frame number of the blurred video frames being equal to the third preset threshold.

Optionally, the screening module may be specifically configured to: take the timestamp of the video frame corresponding to the extreme point as a center, and taking a preset number of video frames in front of the center and after the center as the blurred video frames which are retained after the screening, respectively; wherein the preset number is determined according to the third preset threshold.

The video processing apparatus provided in the embodiment of the present disclosure determines a video frame with low image quality in the initial video, then removes the low-quality video frame from the initial video, and in its place, inserts a higher-quality video frame through an interpolation method. The apparatus can remove blurred frames and inserts clear frames to substitute the removed blurred ones, and thereby the apparatus effectively achieves the purpose of improving the overall video quality.

The video processing apparatus provided in the embodiment of the present disclosure can perform the steps in the video processing method provided in the method embodiments of the present disclosure. The apparatus carries out these steps and delivers the advantageous effects, which, for the sake of brevity, will not be repeated here.

Figure 7:
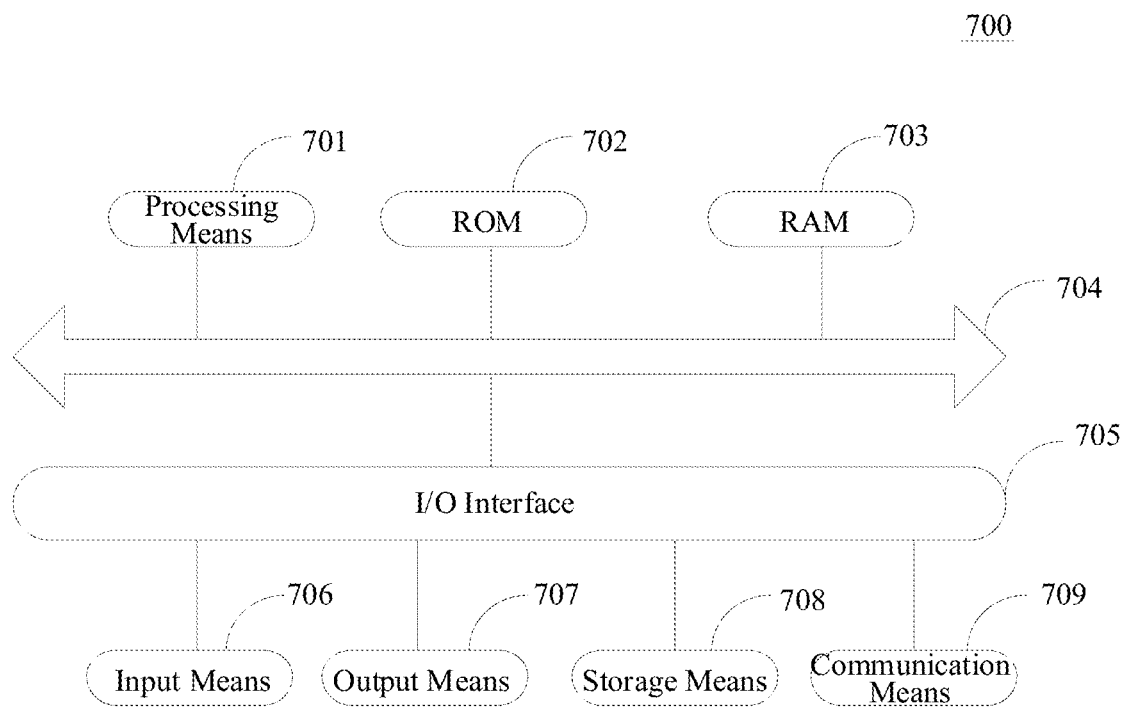
FIG. 7 is a structural schematic diagram of an electronic device in an embodiment of the present disclosure.

FIG. 7 is a structural schematic diagram of an electronic device in an embodiment of the present disclosure. Referring to FIG. 7, a schematic structural diagram of an electronic device 700 for implementing an embodiment of the present disclosure is shown. The electronic device 700 of the embodiment of the present disclosure may comprise, but not limited to, mobile terminals such as mobile phone, laptop, digital broadcast receiver, personal digital assistant (PDA), portable android device (PAD), portable media player (PMP), vehicle terminals (e.g., vehicle navigator terminal), and wearable electronic devices, and fixed terminals such as digital TV, desktop computer, and smart-home devices and etc. The electronic device shown in FIG. 7 is merely an example, and should not bring any limitation to the function and application scope of the embodiment of the present disclosure.

As shown in FIG. 7, the electronic device 700 may comprise a processing means (e.g., a central processing unit, a graphics processing unit, etc.) 701, which can perform various appropriate actions and processes according to a program stored in a read only memory (ROM) 702 or a program loaded from a storage means 708 to a random access memory (RAM) 703 for performing the method of the embodiment described in the present disclosure. The RAM 703 further stores various programs and data required for the operations of the electronic device 700. The processing means 701, ROM 702 and RAM 703 are interconnected with each other via a bus 704. An input/out (I/O) interface 705 is also connected to the bus 704.

Typically, the following devices can be connected to the I/O interface 705: an input means 706 including, e.g., a touch screen, a touch pad, a keyboard, a mouse, a camera, a microphone, an accelerometer, a gyroscope, and etc.; an output means 707 including, e.g., a liquid crystal display (LCD), a speaker, a vibrator, and etc., a storage means 708 including, e.g., a magnetic tape, a hard disc, and etc.; and a communication means 709. The communication means 709 is configured to allow the electronic device 700 to communicate with other devices in wired or wireless manner to exchange data. Although FIG. 7 shows the electronic device 700 including various means, it should be understood that it is not required to implement or have all the shown means. Alternatively, it can implement or have more or less means.

Specially, according to the embodiment of the present disclosure, a process described above with reference to the flowchart can be performed as a computer software program. For example, an embodiment of the present disclosure comprises a computer program product comprising a computer program carried on a non-transitory computer-readable medium, wherein the computer program comprises program codes configured to execute the method shown in the flowchart, thereby performing the method described above. In such an embodiment, the computer program can be downloaded and installed via the communication means 709 from the Internet, or installed from the storage means 708, or installed from the ROM 702. When the computer program is executed by the processing means 701, the functions defined in the method of the embodiment of the present disclosure are performed.

It should be understood that the above computer-readable medium in the present disclosure can be a computer-readable signal medium, or a computer-readable storage medium, or any combination thereof. For example, the computer-readable storage medium can be, but is not limited to, an electric, magnetic, optical, electromagnetic, infrared or semiconductor system, apparatus, device, or any combination thereof. More specific examples of the computer-readable storage medium can comprise, but are not limited to: electric connection with one or more wires, portable computer magnetic disc, hard disc, random accessible memory (RAM), read-only memory (ROM), erasable programmable read-only memory (EPROM or flash memory), optical fiber, portable compact disc read-only memory (CD-ROM), optical storage device, magnetic storage device, or any suitable combination thereof. In the present disclosure, the computer-readable storage medium can be any tangible medium containing or storing a program that can be used by or in combination with an instruction execution system, apparatus or device. And in the present disclosure, the computer-readable signal medium can comprise a data signal propagated in baseband or as a part of carrier wave, which carries computer-readable program codes. Such propagated data signal can be in many forms, including, but being not limited to, electromagnetic signal, optical signal, or any suitable combination thereof. The computer-readable signal medium can also be any computer-readable medium in addition to the computer-readable storage medium, which can send, propagate, or transmit a program used by or in combination with an instruction execution system, apparatus, or device. The program codes contained in the computer-readable medium can be transmitted by any suitable medium including, but being not limited to, electric wire, optical cable, RF (radio frequency), or any suitable combination thereof.

In some embodiments, the client terminal and the server can communicate by using any network protocol that is currently known or will be developed in future, such as, HTTP (HyperText Transfer Protocol), and can be interconnected with a digital data communication in any form or medium (e.g., communication network). Examples of the communication network comprise Local Area Network ("LAN"), Wide Area Network ("WAN"), Internet work (e.g., the Internet) and end-to-end network (e.g., ad hoc end-to-end network), and any network that is currently known or will be developed in future.

The above computer-readable medium can be contained in the above electronic device; or it can also be independently present without being assembled into the electronic device.

The above computer-readable medium carries one or more programs, and when the above one or more programs are executed by the electronic device, it causes the electronic device to perform the operations as follows.

The electronic device is caused to determine a blurred video frame in the initial video; remove the blurred video frame from the initial video to obtain an intermediate video that does not comprise the blurred video frame; determine the video frame to be inserted based on a video frame in the intermediate video whose timestamp is adjacent to the target timestamp, wherein the target timestamp is the timestamp of the blurred video frame; and insert the video frame to be inserted into the intermediate video at a position corresponding to the target timestamp to obtain the target video.

Optionally, when the above one or more programs are executed by the electronic device, the electronic device can further perform other steps described in the above embodiment.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program codes may be executed entirely on the user's computer, partly on the user's computer, as a stand-alone software package, partly on the user's computer and partly on a remote computer, or entirely on the remote computer or server. In the scenario related to a remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order shown in the accompanying drawings. For example, two blocks shown in a successive may in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), and etc.

In the context of the present disclosure, the machine-readable medium may be a tangible medium that may include or store a program for use by or in combination with an instruction-executing system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, the present disclosure provides a video processing method, comprising: determining a blurred video frame in an initial video; removing the blurred video frame from the initial video to obtain an intermediate video that does not comprise the blurred video frame; determining a video frame to be inserted based on a video frame in the intermediate video whose timestamp is adjacent to the target timestamp, wherein the target timestamp is the timestamp of the blurred video frame; and inserting the video frame to be inserted into the intermediate video at a position corresponding to the target timestamp to obtain a target video.

According to one or more embodiments of the present disclosure, in the video processing method, optionally, the determining the blurred video frame in the initial video comprises: determining a first edge image at a preset position in the current video frame based on the Sobel operator, wherein the current video frame is any video frame in the initial video; and determining the blurred video frames based on the edge images at the preset positions in each video frame in the initial video.

According to one or more embodiments of the present disclosure, in the video processing method, optionally, the determining the blurred video frames based on the edge images at the present positions in each video frame in the initial video comprises: determining a first cumulative sum of pixel values of various pixels in the first edge image; determining a second cumulative sum of pixel values of various pixels in a second edge image at a preset position of a neighboring video frame, wherein the neighboring video frame is a video frame adjacent to the current video frame in the initial video; determining an absolute value of a first difference between the first cumulative sum and the second cumulative sum; and determining the blurred video frame based on the absolute value of the first difference.

According to one or more embodiments of the present disclosure, in the video processing method provided in the present disclosure, optionally, the determining the blurred video frame based on the absolute value of the first difference comprises: when the absolute value of the first difference is greater than a first preset threshold, the current video frame is determined as the blurred video frame.

According to one or more embodiments of the present disclosure, in the video processing method provided in the present disclosure, optionally, determining the blurred video frame based on the absolute value of the first difference comprises the steps as follows.

Determining a total number of the first pixels in the first edge image whose pixel value is the target value based on a histogram of the first edge image, wherein the target value is any one of the pixel values in the first edge image; determining a total number of the second pixels in the second edge image whose pixel value is the target value based on a histogram of the second edge image; determining an absolute value of a second difference between the total number of the first pixels and the total number of the second pixels; determining a maximum absolute value of the second differences corresponding to various pixel values in the first edge images; and determining the blurred video frames based on the absolute value of the first difference and the maximum absolute value of the second differences.

According to one or more embodiments of the present disclosure, in the video processing method provided in the present disclosure, optionally, determining the blurred video frames based on the absolute value of the first difference and the maximum absolute value of the second differences comprises: performing a weighted sum on the absolute value of the first difference and the maximum absolute value of the second differences to obtain the blur degree; when the blur degree is greater than the second preset threshold, it is determined that the current video frame is the blurred video frame.

According to one or more embodiments of the present disclosure, in the video processing method provided in the present disclosure, optionally, before determining the first cumulative sum of the pixel values of various pixels in the first edge image, determining the blurred video frame based on the edge images at the preset positions in each video frame in the initial video further comprises: normalizing the edge images at the preset positions in each video frame in the initial video to map the pixel values of the pixels in the edge image to the preset range.

According to one or more embodiments of the present disclosure, in the video processing method provided in the present disclosure, optionally, when the number of the blurred video frames exceeds a third preset threshold, the method further comprises: determining a maximum absolute value of the first difference or a maximum blur degree as an extreme point; and screening the blurred video frames based on a the timestamp of the video frame corresponding to the extreme point to obtain blurred video frames, with the number of the blurred video frame being equal to the third preset threshold.

According to one or more embodiments of the present disclosure, in the video processing method provided in the present disclosure, optionally, screening the blurred video frames based on the timestamp of the video frame corresponding to the extreme point to obtain a blurred video frame comprises: taking the timestamp of the video frame corresponding to the extreme point as a center, sequentially taking a preset number of video frames in front of the center and after the center, respectively, as blurred video frames retained after the screening, wherein the preset number is determined according to the third preset threshold.

According to one or more embodiments of the present disclosure, the present disclosure provides a video processing apparatus, comprising: a first determining module configured to determine a blurred video frame in an initial video; a removing module configured to remove the blurred video frame from the initial video to obtain an intermediate video that does not comprise the blurred video frame; a second determining module configured to determine a video frame to be inserted based on a video frame in the intermediate video whose timestamp is adjacent to the target timestamp, wherein the target timestamp is the timestamp of the blurred video frame; and a frame-inserting module configured to insert the video frame to be inserted into the intermediate video at a position corresponding to the target timestamp to obtain a target video.

According to one or more embodiments of the present disclosure, in the video processing apparatus provided in the present disclosure, optionally, the first determining module specifically comprises: a first determination unit configured to determine a first edge image at a preset position of the current video frame based on the Sobel operator, wherein the current video frame is any video frame in the initial video; a second determination unit configured to determine the blurred video frame based on the edge images at the preset position in each video frame in the initial video.

According to one or more embodiments of the present disclosure, in the video processing apparatus provided in the present disclosure, optionally, the second determination unit specifically comprises: a first determination sub-unit configured to determine a first cumulative sum of pixel values of various pixels in the first edge image; determining a second cumulative sum of pixel values of various pixels in a second edge image at a preset position of a neighboring video frame, wherein the neighboring video frame is a video frame adjacent to the current video frame in the initial video; determining an absolute value of a first difference between the first cumulative sum and the second cumulative sum; and a second determination sub-unit configured to determine the blurred video frame based on the absolute value of the first difference.

According to one or more embodiments of the present disclosure, in the video processing apparatus provided in the present disclosure, optionally, the second determination sub-unit is specifically configured to determine that the current video frame is the blurred video frame when the absolute value of the first difference is greater than the first preset threshold.

According to one or more embodiments of the present disclosure, in the video processing apparatus provided in the present disclosure, optionally, the second determination sub-unit is specifically configured to: determine the total number of the first pixels in the first edge image whose pixel value is the target value based on the histogram of the first edge image, wherein the target value is any one of the pixel values in the first edge image; determine the total number of the second pixels in the second edge image whose pixel value is the target value based on the histogram of the second edge image; determine an absolute value of a second difference between the total number of the first pixels and the total number of the second pixels; determine a maximum absolute value of the second differences corresponding to various pixel values in the first edge image; and determine the blurred video frames based on the absolute value of the first difference and the maximum absolute value of the second differences.

According to one or more embodiments of the present disclosure, in the video processing apparatus provided in the present disclosure, optionally, the second determination sub-unit is specifically configured to: perform a weighted sum on the absolute value of the first difference and the maximum absolute value of the second differences to obtain a blur degree; and determine the current video frame as the blurred video frame when the blur degree is greater than a second preset threshold.

According to one or more embodiments of the present disclosure, the video processing apparatus provided in the present disclosure, optionally, further comprises: a normalization module configured to normalize the edge image at the preset position in each video frame in the initial video, in prior to determining the first cumulative sum of pixel values of various pixels in the first edge image, to map the pixel values of the pixels in the edge image to a preset range; wherein the edge image is a single-channel image.

According to one or more embodiments of the present disclosure, optionally, the video processing apparatus provided in the present disclosure further comprises: a screening module configured to determine a maximum absolute value of the first difference or a maximum blur degree as an extreme point when the number of the blurred video frames exceeds a third preset threshold; and screen the blurred video frames based on the timestamp of the video frame corresponding to the extreme point to obtain blurred video frames, with the number of the blurred video frames being equal to the third preset threshold.

According to one or more embodiments of the present disclosure, in the video processing apparatus provided in the present disclosure, optionally, the screening module is specifically configured to: take the timestamp of the video frame corresponding to the extreme point as a center, and taking a preset number of video frames in front of the center and after the center as the blurred video frames which are retained after screening, respectively; wherein the preset number is determined according to the third preset threshold.

According to one or more embodiments of the present disclosure, the present disclosure provides an electronic device, including:
  one or more processors; and
  a memory configured to store one or more programs;
  wherein the one or more programs cause the one or more processors to perform any video processing method provided in the present disclosure when being executed by the one or more processors.

According to one or more embodiments of the present disclosure, the present disclosure provides a computer storage medium having a computer program stored thereon, wherein when the program is executed by a processor, the video processing method provided in any one embodiment of the present disclosure is performed.

An embodiment of the present disclosure further provides a computer program product comprising a computer program/instruction, wherein when the computer program/instruction are executed by a processor, the video processing method described above is performed.

The above description is merely illustrative of preferred embodiments of the present disclosure and the applied technical principles. Those skilled in the art should understand that the disclosure scope involved in the present disclosure is not limited to technical solutions formed by the specific combinations of the above technical features, but should encompass other technical solutions formed by any combination of the above technical features or equivalent features without departing the above disclosure concepts. For example, the technical solutions formed by replacing the above features with the features having similar functions disclosed in (but not limited to) this disclosure.

Moreover, although various operations are described in a specific order, it should be not be construed that those operations are required to be performed in the shown specific order or in a sequential order. Under certain circumstances, multitasking and parallel processing may be beneficial. Likewise, although several specific implementation details are contained in the above discussion, they should not be construed as limiting the scope of the present disclosure. Some features described in the context of separate embodiments can also be combined in a single embodiment. On the contrary, various features described in the context of a single embodiment can also be implemented in multiple embodiments, alone or in any sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims.

What is claimed is:

1. A video processing method, comprising:
  determining a blurred video frame in an initial video;
  removing the blurred video frame from the initial video to obtain an intermediate video which does not comprise the blurred video frame;
  determining a video frame to be inserted, whose timestamp is a target timestamp in the intermediate video, based on video frames whose timestamps are adjacent to the target timestamp, wherein the target timestamp is a timestamp of the blurred video frame; and
  inserting the video frame to be inserted at a position in the intermediate video corresponding to the target timestamp to obtain a target video;
  wherein determining the blurred video frame in the initial video comprises:
  determining a first edge image at a preset position in a current video frame based on Sobel operator, wherein the current video frame is any video frame in the initial video; and
  determining the blurred video frame based on an edge image at a preset position in each video frame in the initial video;
  wherein determining the blurred video frame based on the edge image at the preset positions in each video frame in the initial video comprises:
  determining a first cumulative sum of pixel values of various pixels in the first edge image;
  determining a second cumulative sum of pixel values of various pixels in a second edge image at a preset position of a neighboring video frame, wherein the neighboring video frame is a video frame adjacent to the current video frame in the initial video;
  determining an absolute value of a first difference between the first cumulative sum and the second cumulative sum; and
  determining the blurred video frame based on the absolute value of the first difference.

2. The method according to claim 1, wherein determining the blurred video frame based on the absolute value of the first difference comprises:
  determining the current video frame as the blurred video frame when the absolute value of the first difference is greater than a first preset threshold.

3. The method according to claim 1, wherein determining the blurred video frame based on the absolute value of the first difference comprises:
  determining a total number of first pixels in the first edge image whose pixel value is the target value based on a histogram of the first edge image;
  determining a total number of second pixels in the second edge image whose pixel value is the target value based on a histogram of the second edge image;
  determining an absolute value of a second difference between the total number of the first pixels and the total number of the second pixels;
  determining a maximum absolute value of the second differences corresponding to various pixel values in the first edge image; and
  determining the blurred video frames based on the absolute value of the first difference and the maximum absolute value of the second differences.

4. The method according to claim 3, wherein determining the blurred video frame based on the absolute value of the first difference and the maximum absolute value of the second differences comprises:
  obtaining a blur degree by performing a weighted sum on the absolute value of the first difference and the maximum absolute value of the second differences; and
  determining the current video frame as the blurred video frame when the blur degree is greater than a second preset threshold.

5. The method according to claim 4, wherein when a number of blurred video frames exceeds a third preset threshold, the method further comprises:
  determining a maximum absolute value of the first difference or a maximum blur degree as an extreme point; and
  screening the blurred video frames based on a video frame whose timestamp corresponds to the extreme point to obtain the blurred video frames with the number of the blurred video frames being equal to the third preset threshold.

6. The method according to claim 5, wherein screening the blurred video frames based on the timestamp of the video frame corresponding to the extreme point to obtain the blurred video frames with the number of the blurred video frames being equal to the third preset threshold comprises:
  taking the timestamp of the video frame corresponding to the extreme point as a center, and taking a preset number of video frames in front of the center and after the center as the blurred video frames which are retained after the screening, respectively;
  wherein the preset number is determined according to the third preset threshold.

7. The method according to claim 1, wherein in prior to determining the first cumulative sum of the pixel values of the various pixels in the first edge image, determining the blurred video frame based on edge images at the preset positions of each video frame in the initial video further comprises:
  normalizing the edge images at the preset positions in each video frame in the initial video to map the pixel values of the pixels in the edge images to a preset range.

8. A video processing apparatus, comprising:
  a first determining module configured to determine a blurred video frame in an initial video;
  a removing module configured to remove the blurred video frame from the initial video to obtain an intermediate video which does not comprise the blurred video frame;
  a second determining module configured to determine a video frame to be inserted, whose timestamp is a target timestamp in the intermediate video, based on video frames whose timestamps are adjacent to the target timestamp, wherein the target timestamp is a timestamp of the blurred video frame; and
  a frame-inserting module configured to insert the video frame to be inserted at a position corresponding to the target timestamp in the intermediate video to obtain a target video;
  wherein the first determining module comprises; a first determination unit and a second determination unit, the first determination unit is configured to determine a first edge image at a preset position in a current video frame based on Sobel operator, wherein the current video frame is any video frame in the initial video;

the second determination unit is configured to determine the blurred video frame based on an edge image at a preset position in each video frame in the initial video;

wherein the second determination unit comprises: a first determination sub-unit and a second determination sub-unit, the first determination sub-unit is configured to determine a first cumulative sum of pixel values of various pixels in the first edge image; determine a second cumulative sum of pixel values of various pixels in a second edge image at a preset position of a neighboring video frame, wherein the neighboring video frame is a video frame adjacent to the current video frame in the initial video; determine an absolute value of a first difference between the first cumulative sum and the second cumulative sum;

the second determination sub-unit is configured to determine the blurred video frame based on the absolute value of the first difference.

9. An electronic device, comprising:
one or more processors; and
a storage apparatus configured to store one or more programs;
wherein when the one or more programs are executed by the one or more processors, the one or more processors are caused to:
determine a blurred video frame in an initial video;
remove the blurred video frame from the initial video to obtain an intermediate video which does not comprise the blurred video frame;
determine a video frame to be inserted, whose timestamp is a target timestamp in the intermediate video, based on video frames whose timestamps are adjacent to the target timestamp, wherein the target timestamp is a timestamp of the blurred video frame; and
insert the video frame to be inserted at a position in the intermediate video corresponding to the target timestamp to obtain a target video;
wherein the processor is further caused to:
determine a first edge image at a preset position in a current video frame based on a Sobel operator, wherein the current video frame is any video frame in the initial video; and
determine the blurred video frame based on edge images at the preset positions in each video frame in the initial video;
wherein the processor is further caused to:
determine a first cumulative sum of pixel values of various pixels in the first edge image;
determine a second cumulative sum of pixel values of various pixels in a second edge image at a preset position of a neighboring video frame, wherein the neighboring video frame is a video frame adjacent to the current video frame in the initial video;
determine an absolute value of a first difference between the first cumulative sum and the second cumulative sum; and
determine the blurred video frame based on the absolute value of the first difference.

10. The electronic device of claim 9, wherein the processor is further caused to determine the current video frame as the blurred video frame when the absolute value of the first difference is greater than a first preset threshold.

11. The electronic device of claim 9, wherein the processor is further caused to:
determine a total number of first pixels in the first edge image whose pixel value is the target value based on a histogram of the first edge image;
determine a total number of second pixels in the second edge image whose pixel value is the target value based on a histogram of the second edge image;
determine an absolute value of a second difference between the total number of the first pixels and the total number of the second pixels;
determine a maximum absolute value of the second differences corresponding to various pixel values in the first edge images; and
determine the blurred video frame based on the absolute value of the first difference and the maximum absolute value of the second differences.

12. The electronic device of claim 11, wherein the processor is further caused to:
obtain a blur degree by performing a weighted sum on the absolute value of the first difference and the maximum absolute value of the second differences; and
determine the current video frame as the blurred video frame when the blur degree is greater than a second preset threshold.

13. The electronic device of claim 12, wherein the processor is further caused to:
determine a maximum absolute value of the first difference or a maximum blur degree as an extreme point, and screen the blurred video frames based on a timestamp of the video frame corresponding to the extreme point to obtain blurred video frames with the number of the blurred video frames being equal to a third preset threshold.

14. The electronic device of claim 13, wherein the processor is further caused to:
take the timestamp of the video frame corresponding to the extreme point as a center, and take a preset number of video frames in front of the center and after the center as the blurred video frames which are retained after the screening, respectively,
wherein the preset number is determined according to the third preset threshold.

15. The electronic device of claim 9, wherein the processor is further caused to:
normalize the edge images at the preset positions of the various video frames in the initial video, in prior to determining the first cumulative sum of pixel values of various pixels in the first edge image, to map the pixel values of the pixels in the edge image to a preset range.

16. A non-transitory computer-readable storage medium having a computer program stored thereon, wherein when the computer program is executed by a processor, the method of claim 1 is performed.

* * * * *